S. Sherwood.
Turbine Water Wheel.
N° 94,139. Patented Aug. 24, 1869.
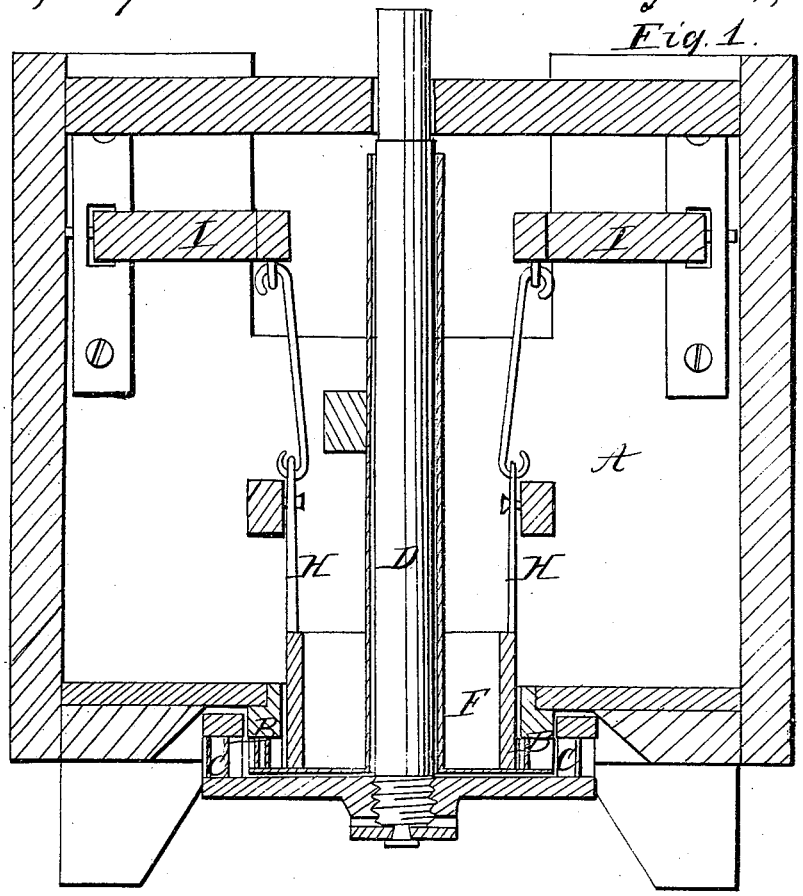
Fig. 1.
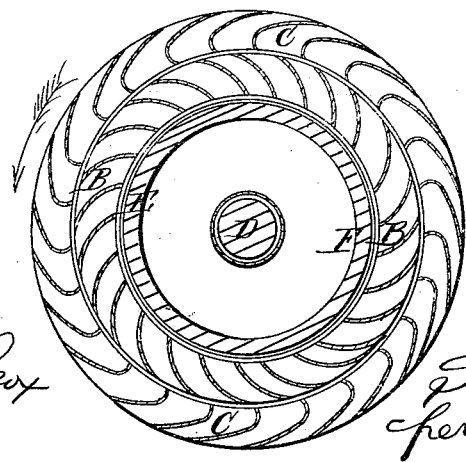
Fig. 2.
Witnesses,
Cornelius Cox
Leopold Evert
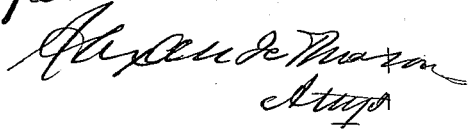
Inventor,
S. Sherwood
per
Alexander Mason
Atty

United States Patent Office.

S. SHERWOOD, OF INDEPENDENCE, IOWA.

Letters Patent No. 94,139, dated August 24, 1869.

IMPROVEMENT IN WATER-WHEELS.

The Schedule referred to in these Letters Patent and making part of the same.

*To all whom it may concern:*

Be it known that I, S. SHERWOOD, of Independence, in the county of Buchanan, and in the State of Iowa, have invented new and useful Improvements in Water-Wheels; and do hereby declare that the following is a full, clear, and exact description thereof, reference being had to the accompanying drawings, and to the letters of reference marked thereon.

The object of my invention is to provide a water-wheel which will give the greatest amount of power, by giving the buckets a peculiar shape, from the smallest quantity of water, and which shall be simple in its construction, and easily managed and controlled.

Figure 1 is a sectional view of my invention.

Figure 2 is a plan view of the wheel, showing the shape of the buckets.

Letter A represents the box, in the bottom of which the wheel is placed, and which has an opening in its side, through which the water is introduced.

Extending downward from the bottom of the box there is placed a small circular box, B, just large enough to fit inside of the wheel C.

The sides of this box are open all around its sides, so that the water can pass through, so as to operate the wheel C.

Placed in the side of this box, there is a number of curved plates, placed so as to guide the water in its passage through, in such a manner that it will strike the buckets of the wheel just at a certain point.

Surrounding the box B is the water-wheel C, which is attached to the upright shaft D.

This wheel is similar in shape to the ordinary turbine-wheels, with the exception that the buckets are formed differently. Just upon the inner surface of the buckets or plates they are curved suddenly around, and then extend backward and outward, as seen in fig. 2.

As the water rushes from the box B, the curved pieces in the side throw it directly against the buckets where they are most curved, and thus the whole force of the water is brought to bear directly upon the wheel, before it can escape.

Screwed into this wheel is the shaft D, by means of which the motion is communicated to the machinery.

The lower end of this shaft is pivoted upon and has its bearings on a brace provided for that purpose, while the upper part is encased in a tube or cover, which extends up above the level of the water.

Inside of the box B is placed the gate F, for the purpose of controlling the flow of the water.

This gate is of a circular form, and is made to work up and down by means of levers.

Extending upward from the top of this gate there are two arms, H, which are connected with the lever I, by means of two short rods.

By raising this lever, the gate is drawn upward, and the water allowed to escape, but by depressing this lever, the water is shut off and the machinery stopped.

Having thus described my invention,

What I claim, and desire to secure by Letters Patent, is—

1. The gate F, provided with the arms H, in combination with the lever I, when used in the manner and for the purpose set forth.

2. The wheel C, in combination with the box B, gate F, lever I, and shaft D, when all are constructed and operated substantially in the manner described.

In testimony that I claim the foregoing, I have hereunto set my hand, this 17th day of March, 1869.

S. SHERWOOD.

Witnesses:
J. S. WOODWARD,
C. J. WILCOX.